United States Patent
Dias et al.

(10) Patent No.: US 9,105,046 B1
(45) Date of Patent: Aug. 11, 2015

(54) CONSTRAINING AD SERVICE BASED ON APP CONTENT

(75) Inventors: Antonio Alvin Jose Dias, Foster City, CA (US); Nicholas S. Bridle, Houston, TX (US); Nareshkumar Rajkumar, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 809 days.

(21) Appl. No.: 13/204,339

(22) Filed: Aug. 5, 2011

(51) Int. Cl.
*G06F 15/16* (2006.01)
*G06Q 30/02* (2012.01)

(52) U.S. Cl.
CPC .................................. *G06Q 30/0251* (2013.01)

(58) Field of Classification Search
CPC ................................................ G06Q 30/0251
USPC ......................................................... 709/203
See application file for complete search history.

(56) References Cited

U.S. PATENT DOCUMENTS

| | | | |
|---|---|---|---|
| 2003/0002709 A1 | 1/2003 | Wu | |
| 2008/0287150 A1* | 11/2008 | Jiang et al. | 455/466 |
| 2009/0049090 A1 | 2/2009 | Shenfield et al. | |
| 2009/0094105 A1* | 4/2009 | Gounares et al. | 705/14 |
| 2009/0177532 A1* | 7/2009 | Brown et al. | 705/10 |
| 2009/0234861 A1 | 9/2009 | Ramer et al. | |
| 2009/0298480 A1* | 12/2009 | Khambete et al. | 455/414.1 |
| 2010/0030692 A1* | 2/2010 | Turakhia | 705/50 |
| 2010/0037204 A1* | 2/2010 | Lin et al. | 717/106 |
| 2010/0114682 A1 | 5/2010 | Bosco et al. | |
| 2010/0228591 A1* | 9/2010 | Therani et al. | 705/10 |
| 2010/0228592 A1* | 9/2010 | Anderson et al. | 705/10 |
| 2011/0047006 A1 | 2/2011 | Attenberg et al. | |
| 2011/0047028 A1* | 2/2011 | Kim et al. | 705/14.52 |
| 2011/0066488 A1* | 3/2011 | Ludewig et al. | 705/14.43 |
| 2011/0238495 A1* | 9/2011 | Kang | 705/14.49 |

* cited by examiner

*Primary Examiner* — David X Yi
(74) *Attorney, Agent, or Firm* — Birch, Stewart, Kolasch & Birch, LLP

(57) ABSTRACT

Application content information is obtained from a mobile device application server. An ad server log includes at least application identifiers for applications that have requested advertisements from an ad network. If identifying information included in the application content information is the same as an application identifier found in the ad server log, the application content information is analyzed to determine whether the corresponding mobile device application is appropriate to be served an advertisement, based on predetermined content criteria. An application registry includes a database of mobile device applications that are registered in the ad network. The application registry record for a mobile device application is updated to indicate the determined appropriateness of the mobile device application corresponding to the analyzed application content information.

11 Claims, 5 Drawing Sheets

240

| App Identifier | com.weather.app | ⟋ 132 |
| --- | --- | --- |
| Device model | Nexus 1 | |
| Communications Carrier | vodaphone | |
| ... | ... | |
| . | . | |

| App Identifier | 1234abcd!@#$ | ⟋ 132 |
| --- | --- | --- |
| Title | Girls Going Crazy | |
| Description | Debauched coeds ... | |
| Category | entertainment | |
| ... | ... | |

FIG. 4

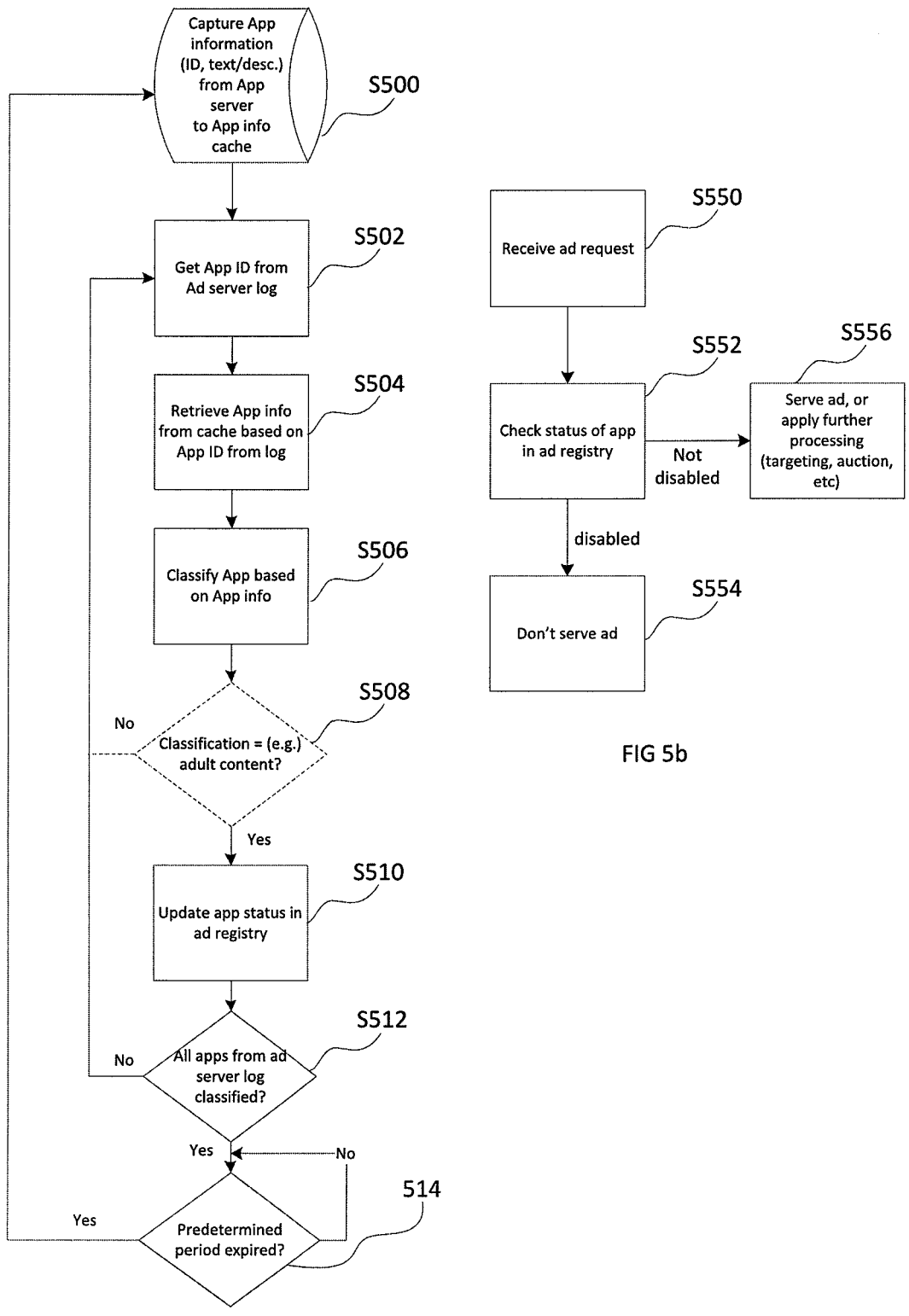

CONSTRAINING AD SERVICE BASED ON APP CONTENT

FIELD OF THE INVENTION

The present disclosure generally relates to the serving of advertisements in application software (herein referred to as "mobile app," "publisher app," or just "app") executed on a mobile terminal device. More particularly, the disclosure relates to detecting the type of content provided in an app and preventing the serving of advertisements depending on the detected type of content.

BACKGROUND

Terminal devices, including, but not limited to "smart" mobile telephones (smartphones), Personal Data Assistants (PDAs), laptop computers, tablet computers, e-book readers, set-top boxes, etc. are currently capable of loading apps which, in combination with an Internet connection may be designed to receive and display to the device's user targeted or untargeted advertising. The user typically may select or otherwise interact with the advertisement (ad), for example by clicking or touching, resulting in a resulting action such as opening a webpage, download site, or other network-accessible URL.

Advertisers provide ads for distribution to ad-requesting apps that reside on, for example, mobile terminal devices. In many cases, the advertisers provide their ads to at least one ad network. An ad network is an entity that connects advertisers to publishers that want to host advertisements. The ad network controls distribution of the ads to the ad-requesting apps via an ad server. The ad server may employ various means to target ads to appropriate apps. The ad network controls distribution to requesting apps of ads provided by the advertisers, selecting an appropriate advertisement and providing the advertisement for display by the requesting app.

An app publisher is an entity that controls the content of an app and may implement in the app a particular software development kit (SDK), supplied by the ad network. The SDK provides, for inclusion in the app, code or binaries to request one or more advertisements served by an ad server in an ad network. Ads distributed to publisher apps may be targeted based on one or more of several criteria including, but not limited to, ad consumer- or user-attributes supplied by the requesting publisher app, device attributes supplied via the publisher app and obtained from a device on which the publisher app resides (i.e., computer, mobile terminal device, point-of-sale, etc.), advertiser and/or publisher preferences, and/or any other available information. Alternatively, ads may be distributed blindly to any publisher that requests ads, although some ad networks offer a site opt-out.

An app publisher may register an app in the ad network associated with the ad server. This allows the app publisher to, for example, specify criteria for the type/number/format/target demographic/etc. of ads requested, and allows the ad server to more readily match ads with requests.

For distribution the app publisher typically provides the app to an app serving site (which may include at least major operating system-related app sites, various carrier or service provider sites, or independent one-off app sites) where users accessing the app serving site may download the app for use with the user's mobile terminal device. The app serving site stores at least information corresponding to the particular app, such as an identifier and text or descriptive information, such information being publicly or privately accessible.

However, the inventors have recognized a need in some instances to prevent ads from being distributed to certain types of apps, due to app server policies, advertiser criteria, ad publisher policies, and/or legal restrictions. Until now, no means has been provided for easily preventing all ads in an ad network from being distributed to a requesting app.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

In a disclosed embodiment, application content information is obtained from a mobile device application server and is stored. The content information includes descriptive information and identifying information of a first mobile device application. A determination is made as to whether the identifying information of the first mobile device application corresponds to an application identifier found in ad request logs of an ad server. The application content information is analyzed to determine whether or not the first mobile device application is appropriate to be served an advertisement, based on predetermined content criteria. An app registry in an ad network includes a database of mobile device applications registered in the ad network. The app registry is updated to indicate the determined appropriateness of the first mobile device application.

In a disclosed embodiment the updating of the app registry updates for the first mobile device application an ad service status in the app registry.

In a disclosed embodiment the first mobile device application is determined as not appropriate to be served an advertisement when the analysis determines that the first mobile device application includes adult content.

In a disclosed embodiment the determining of appropriateness results in associating the application content information with one of one or more content classifications, and the ad service status for the first mobile device application is updated based on the associated classification.

In a disclosed embodiment the determination of appropriateness and the classification of the application content information are performed by an application classification controller comprising a processor configured to classify the content information.

In a disclosed embodiment the application classification controller uses statistical machine learning techniques to perform determination of appropriateness and the classification of the application content information.

In a disclosed embodiment the application content information analyzed by the analysis includes text and pictorial information, the text being analyzed for the existence, frequency, and/or context of predetermined terms, and the pictorial information being analyzed for the existence and context of predetermined attributes related to the resulting content classification.

In a disclosed embodiment the mobile device application server provides mobile device applications for download to a mobile terminal device.

In a disclosed embodiment the application content information of the first mobile device application includes a unique application identifier and text including one or more of: a title, an application rating; a category; a text description, URL, developer information; keywords; and/or graphics.

In an alternative embodiment, content information of respective one or more mobile device applications is obtained from a mobile device application server and is stored in a storage medium. The content information includes descriptive information and identifying information of the mobile device application(s). The obtained content information is analyzed for each mobile device application to determine whether or not each mobile device application is appropriate to be served an advertisement, the appropriateness based on predetermined content criteria. A tag is associated with the stored content information for each mobile device application, the tag indicating the determined appropriateness.

In a disclosed embodiment the content tag indicates at least one class of predetermined one or more classes of content information, the class determined by the analysis of the stored content information.

In a disclosed embodiment the application classification controller uses statistical machine learning techniques to perform determination of appropriateness and the classification of the application content information.

In a disclosed embodiment the content tag indicates that the corresponding mobile device application may contain adult content.

In a disclosed embodiment it is determined whether each obtained identification information matches respective application identifiers included in an advertisement request log of an ad server at a time which may be distinct from the analysis of the respective stored content information. The advertisement request log includes at least an application identifier for each mobile device application that previously requested an advertisement from the ad server. When identification information matches one of the application identifiers, and the content information corresponding to the identification information is associated with the content tag, the app registry is updated to indicate the determined appropriateness for serving an advertisement to the corresponding mobile device application, where the app registry includes a database of mobile device applications registered in an ad network.

The updating of the app registry may include updating a status for the corresponding mobile device application. The status may be updated to designate that the corresponding mobile device application cannot be sent an advertisement from the ad server when the analysis determines that the corresponding mobile device application is not appropriate to be served an advertisement.

The alternative embodiment may further include receiving an ad request from a requesting mobile device application. The application identifying information received in the ad request is used to determine the existence of a record for and status of the requesting mobile device application in the app registry. If status of the requesting mobile device application is represented in the app registry, the provision of an advertisement to the requesting mobile device application is conditional on the status. If the status corresponding to the requesting mobile device application does not prevent an advertisement from being served to the requesting mobile device application, the application identifying information received in the ad request is used to look up corresponding stored content information. If the corresponding stored content information exists and is tagged, the serving of advertisements to the requesting mobile device application, is conditional based on the tag.

In a disclosed embodiment the status indicates that the requesting mobile device application cannot be served an ad.

In a disclosed embodiment the tag indicates that the requesting mobile device application cannot be served an ad.

In another embodiment, an apparatus includes an application content information collector, a storage medium, an log analyzer, a content information selector, an app content classifier, and a status updater. The application content information collector obtains, from a mobile device application server, application content information that describes and identifies a first mobile device application. The storage medium stores the obtained content information. The log analyzer analyzes logs of an ad server to collect identifying information of a second mobile device application that previously requested an advertisement from the ad server. The content information selector selects the stored application content information of the second mobile device application when the content information that identifies the first mobile device application is the same as the collected identifying information of the second mobile device application. The app content classifier determines, via analysis of the selected application content information, whether or not the application content information of the first mobile device application includes content appropriate for receiving advertisements, based on updatable predetermined criteria. The status updater updates a status of the first mobile device application in an application registry of an ad network when the app content classifier determines that the application content information for the first mobile device application includes the one of the one or more classes of content.

In a disclosed embodiment an apparatus comprises an application content information collector, a storage medium, an app content classifier, and an application content information tagger. The application content information collector obtains, from a mobile device application server, content information that includes identifying and descriptive information of respective one or more mobile device applications. The storage medium stores the obtained content information. The app content classifier determines, by analysis of the stored content information, a class of content information for each of the one or more mobile device applications. The application content information tagger associates with the obtained content information in the storage medium a tag that indicates that a corresponding one of the one or more mobile device applications includes content of the determined class.

The disclosed embodiment may further comprise a status updating unit that, at a time which may be distinct from the classification of the respective stored content information, determines whether identifying information of each mobile device application corresponds to an application identifier in an ad request logs of an ad server. For each application identifier that corresponds to identifying information, the status updating unit uses the application identifier as an index to look up a record in an app registry of the ad server, and updates a status of the mobile device application in the record based on the tag stored with corresponding content information in the storage medium, the app registry including a database of mobile device applications registered in an ad network.

The methods described herein may be implemented as instructions recorded on a non-transitory computer-readable medium, which, when the instructions are executed by a computer, may performs the steps described in the methods.

Further scope of applicability of the present invention will become apparent from the Detailed Description given below. However, it should be understood that the Detailed Description and specific examples, while indicating preferred embodiments of the invention, are given by way of illustration only, since various changes and modifications within the spirit and scope of the invention will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

FIG. 3 shows an example of information that may be provided by a mobile device application in an ad request;

FIG. 4 shows an example of application information available from a mobile device application information aggregator or mobile device application provider;

FIG. 5a is a flow chart of actions taken by an application classification controller in a first embodiment;

FIG. 5b is a flow char of actions taken by an ad server in the first embodiment;

Figure 1:
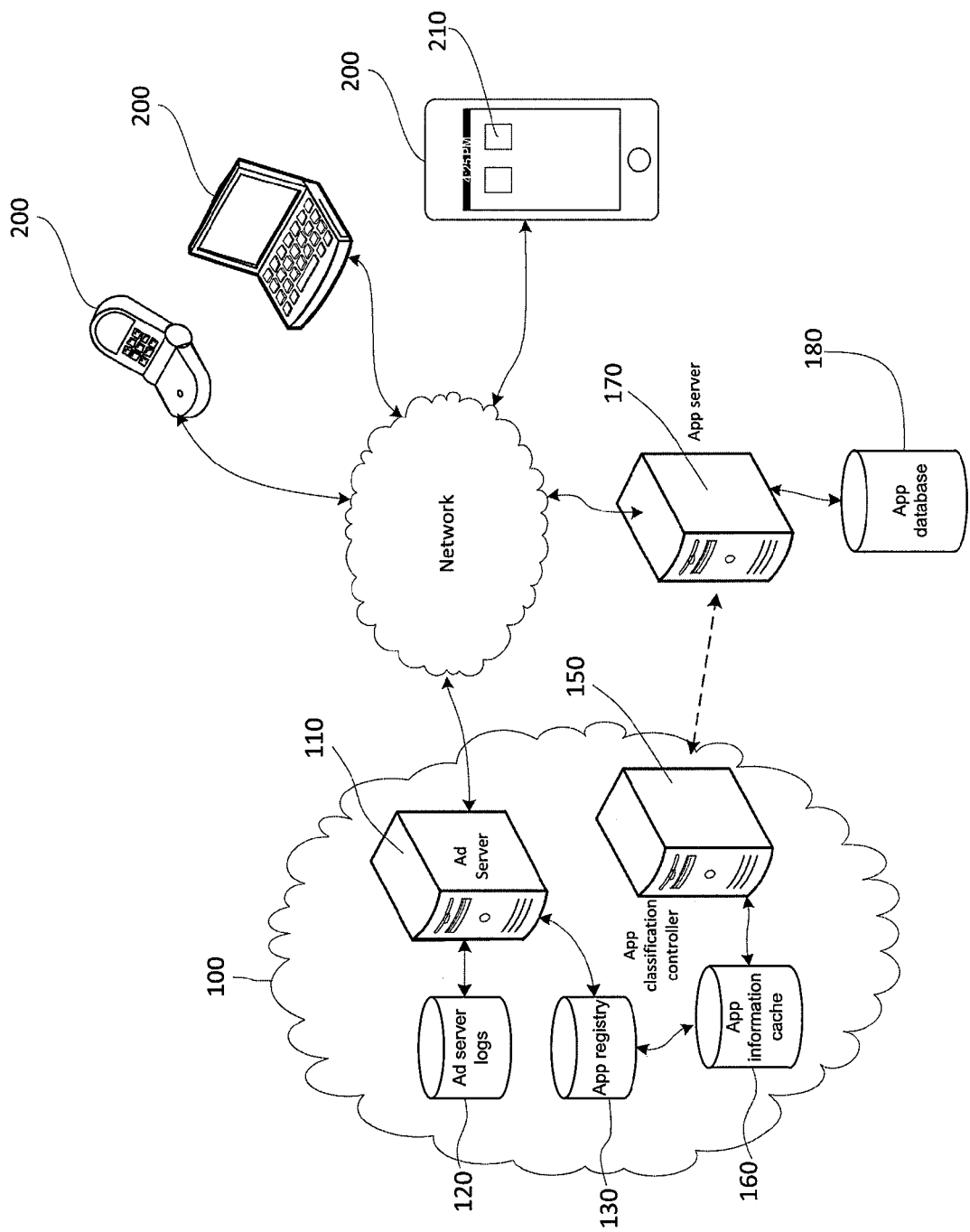
FIG. 1 shows a block diagram of an exemplary architecture for classifying the content of a mobile device application and placing advertising on the mobile device application in accordance with such classification.

The headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

Various techniques for controlling the delivery of advertisements to mobile terminal devices are disclosed herein. For example, ads are matched with parameters passed to an ad server and then delivered to an app to be displayed with the app's content. Unique content and/or publisher identification information may be gathered from the device and from information previously provided to the ad publisher. Fees are assessed based on the degree of targeting. These and other improvements are described in detail below.

An ad network 100 includes one or more ad servers 110 and one or more app classification controllers 150. An ad server 110 receives and processes requests for advertisements. The ad server 110 may process the ad requests to target ads, or to prevent ads from being served, to consumers based on various criteria as shall be described below in more detail. The ad server 110 may include one or more ad server logs 120 and an app registry 130. The ad server logs 120 are records of information associated with the ad requests, and may include time information, identifiers of requesting devices or applications, whether and which ads were provided to the requestor, and/or other data related to the request.

The app classification controller 150 uses app information provided in an app information cache 160 to classify the content of mobile applications. The app information cache 160 is populated by a periodic download of app information 172 (not shown in FIG. 1) from an app server 170. App servers are sources of downloadable application software for mobile terminal devices 200. It will be appreciated that app servers exist or may come into existence that provide apps for many operating systems and/or devices. The app information 172 may include, but is not limited to: an app identifier 132, title, description, category, rating, URL, keywords, cost, age of app, copyright information, and/or images associated with the app.

Those having skill in the art will appreciate that app servers are not limited to major commercial entities, however, as an app server 170 may offer a single mobile application. Moreover, for purposes of this disclosure an app server 170 may provide only information that identifies and/or describes mobile application software. Such identifying and/or descriptive information may be provided in an app database 180 regardless of whether downloadable applications are provided. Furthermore, it will be appreciated that mobile application software need not be limited to portable, wireless devices such as "smartphones," and may include a variety of wired or wireless devices capable of executing "mobile" application software.

Figure 2:
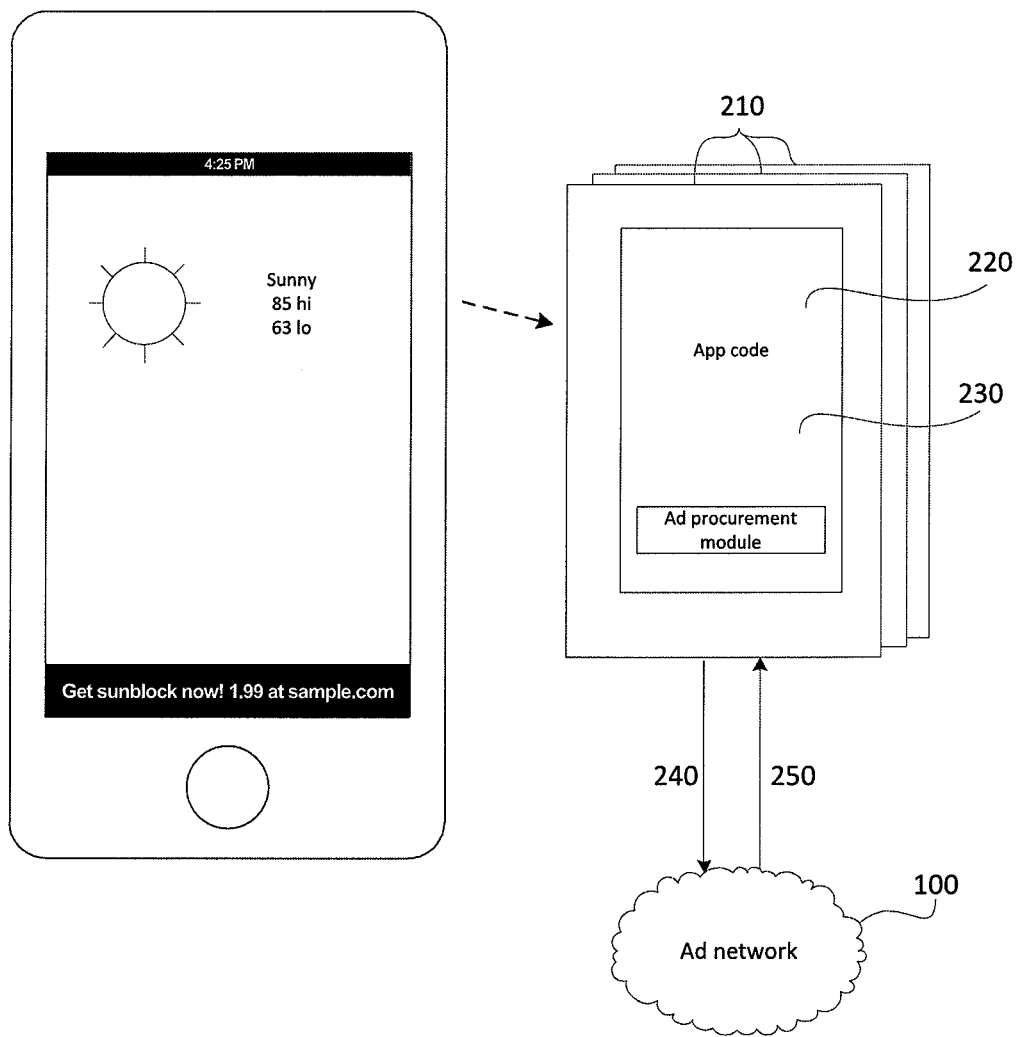
FIG. 2 shows a block diagram of a mobile device application.

FIG. 2 illustrates one example of a mobile terminal device 200 shown executing a weather application, the weather application including an advertisement for sunblock. Mobile application software (publisher app 210) is shown as a block diagram. Publishers of mobile application software wishing to monetize their publisher apps 210 may include, in the executable code 220 that constitutes the app, one or more ad procurement modules 230. The ad procurement module 230 may be obtained from the ad network 100 as part of a software development kit (SDK) for the purpose of requesting ads from the ad network 100.

Returning for a moment to FIG. 1, app registry 130 may provide a record of mobile applications that include the ad procurement module 230, as registered by the app developer or publisher. In some embodiments the publisher app 210 may be registered automatically when the publisher obtains the ad procurement module 230, or registered automatically upon receiving the first ad request therefrom. The process of registering the publisher app 210 in the ad network 100 may provide the mobile app with an app identifier 132 that uniquely identifies the corresponding publisher app 210. In other embodiments, such app identifier 132 may be assigned by an app server 170, by a communications carrier, or other entity.

The app registry associates a status with each registered publisher app 210. The status may include labels such as "approved," "pending review", "disabled," or values representing same or similar. However, the status is not limited to a particular number of options or a particular format. Upon receiving an ad request 240, the ad server 110 looks up the app identifier 132 of the requesting publisher app 210 in the app registry 130 to obtain the app's status. The status may be used to determine whether an ad is served. In the case of a "disabled" status, no ad is served to the requesting publisher app.

In an alternate embodiment, a publisher app associated with a "disabled" status may be sent a dummy ad or non-ad response. In the case of a "pending review" status, service of ads to the corresponding publisher app 210 may be prevented while, for example, the content of the requesting publisher app 210 is subjected to further review. A "pending review" status assignment may result from classification of app content that is not reliably determined. For example, app content may by some measures appear to be adult in nature, for example, such as medical apps that may include keywords or descriptions having similarities to those in adult content apps. Newly registered apps may have no status, or be assigned a default status until classification of the app is performed.

When executed, the ad procurement module 230 communicates an ad request 240 to the ad network 100 and may in response receive ad information 250 for presentation to the user of the requesting publisher app 210. The ad request 240 may include various app, device and/or user information, including at least the app identifier 132 and, for example, demographic information of the user, geographic location, device model, communications carrier, etc. As may be appreciated by one of skill in the art, the example provided in FIG. 3 does not limit the format or data provided in ad request 240 or of app identifier 132.

Embodiment 1

In FIGS. 5a-5b, a process of periodically classifying apps according to a first embodiment is described. In FIG. 5a, app classification controller 150 obtains app information 172 (S500). The app information may be obtained by any reasonable means, including: as an automated or manual response to an electronic request for same, or by scraping contents from an app information web page. The app information 172 is stored in an app information cache 160 for classification by the app classification controller 150.

The app classification controller 150 obtains app identifiers 132 from the ad server logs 120 (S502), thereby identifying publisher apps 210 that have previously requested ads to be served. The app classification controller 150 uses the app identifiers 132 from the ad server log to look up corresponding app information 172 in the app information cache 160 (S504), such that only publisher apps that have previously requested an ad, or otherwise communicated with the ad server 110, will have their content classified. As the number of apps provided by some app servers is considerably large and growing, the consideration of only those publisher apps that have previously requested ads may reduce the time to process the classifications.

App content information matching the app information 172 obtained from the lookup is then classified according to the content of app information (S506). The classification may include statistical machine-learning to analyze the app information for its content. Any classification method that uses supervised learning, unsupervised learning, reinforcement learning, direct string matching, etc. on a processor may be used to classify the app content according to predefined parameters. In one embodiment, the classifier uses an unsupervised Bayesian clustering mechanism taking text as input and generating meaningful topics as output. The topics are used to generate content types. The app information 172, in one embodiment, is thus analyzed for adult content and is classified according to a binary classification. That is, the app information 172 that is analyzed for a publisher app 210 is classified as having adult content or not. It will be appreciated by those of skill in the art, however, that the number and type of classifications need not be limited to two, and may respectively correspond to content types additional to, or instead of, adult content. Adult content may include, but is not limited to, content having: pornography, nudity, sex, violence, profane language, guns, bombs, ammunition, alcohol, drugs, tobacco, hate speech, obscenities, gaming, gambling, and/or illegal content, etc.

If the resulting classification satisfies predetermined criteria (e.g., "adult content"), (S508) the classification controller 120 updates (S510) the status of the corresponding publisher app 210 in the app registry 130 to reflect the "disabled" status, thus preventing ad service to the corresponding publisher app. The app classification controller 150 determines if all app information 172 matching app identifiers from the ad server log 120 have been classified and, if not, moves to the next app information 172 record (S512). Although not illustrated, it is appreciated that multiple classifications may be performed in parallel, such as by use of parallel processing or by multiple app classification controllers each acting on a predetermined subset of records in the app information cache. If all app information corresponding to the app identifiers obtained from the ad server log 120 has been classified, the app classification controller 150 rests until a predetermined cycle period expires, at which time the classification process restarts (S514).

In some embodiments, the app classification controller 150 may be further trained with a "white list" of apps known to trigger false classifications. The app classification controller 150 may use attributes of publisher apps in the white list to "learn" greater efficiency in classifying new publisher apps.

As shown in FIG. 5b, when a publisher app 210 requests an ad (S550), the status of the requesting publisher app 210 is checked in the app registry 130 (S552). If the status corresponding to the requesting publisher app is "disabled," no ad is served, and the ad server 110 stops processing the request (S554). However, if the status of the requesting publisher app 210 is not "disabled," the ad server 110 may further process the request according to targeting or other parameters (S556) or simply serve an untargeted ad to the requesting publisher app 210 (not shown).

Embodiment 2

Figure 6A:
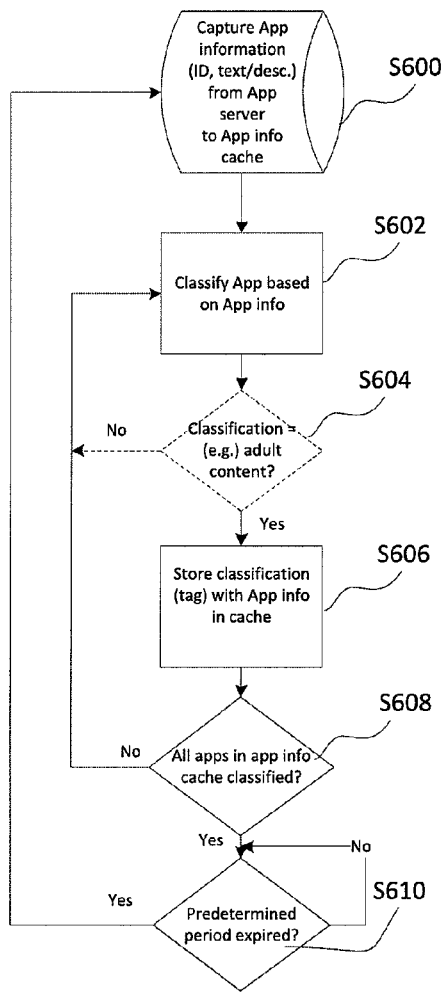
FIG. 6a is a flow chart of actions taken by an application classification controller in a second embodiment.
Figure 6B:
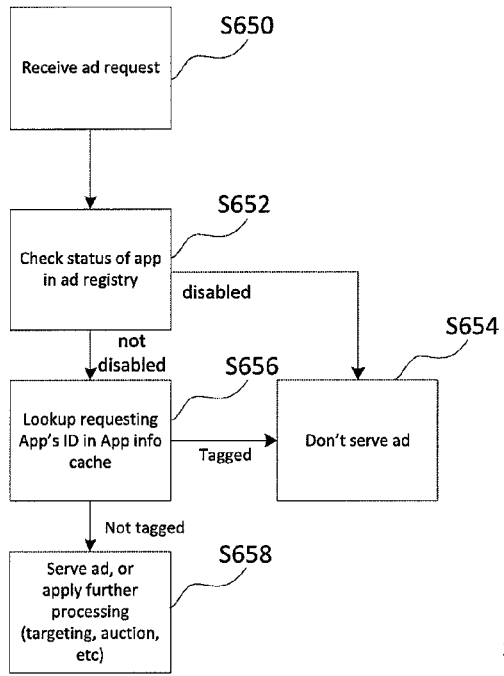
FIG. 6b is a flow char of actions taken by an ad server in the second embodiment.
Figure 6C:
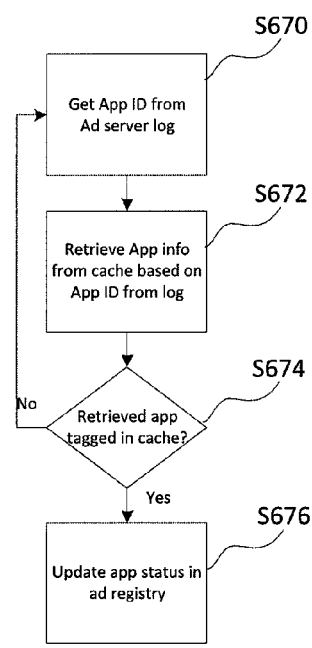
FIG. 6c is a flow chart of actions taken by the application classification controller in the second embodiment.

In FIGS. 6a-6c another embodiment is presented. It is noted that the first embodiment classifies only the content of publisher apps that have previously requested an ad from the ad server 110. Moreover, while the app classification controller 150 is performing classification, a new publisher app 210 may request ads before the app classification controller 150 has updated the status of the app in the app registry 130. Or it may be that a requesting publisher app 210 is not registered in the app registry, and a status update could not, therefore, affect the service of ads to the requesting app. Further, in the previous embodiment content is classified only for publisher apps that have previously requested ads and thus appear in the ad server logs. Consequently, ads could be served to a publisher app that does not yet appear in the ad server logs 120. An embodiment may be considered in which the app information 172 in the app information cache 160 can be tagged regardless of its prior ad requesting history.

As in embodiment 1, app information 172 is obtained from an app server 170 and stored in app information cache 160 (S600). However, the app classification controller 150 classifies the app information 172 of every publisher app 210 represented in the app information cache 160 upon receipt from the app server 170 (S602). The corresponding records in the app information cache 160 are respectively updated to include a classification tag indicating the classification (S606). In some embodiments only app information 172 classified as having adult content is tagged (S604). When all app information 172 in the app information cache 160 has been classified by the app classification controller 150 (S608), the app classification controller rests until a predetermined period expires (S610).

When an ad request is received (S650) from a publisher app 210, the ad server 110 checks the status of the app in the app registry 130 as before (S652). If the status is found, and indicates "disabled," no ad is served (S654). As noted above, the requesting app may not be listed in the registry yet, or its status is not updated. Thus, the status check alone may not prevent service of an ad to a publisher app 210 having content that does not satisfy the predetermined criteria. In this embodiment, the ad server 110 looks up the app identifier 132 of the requesting publisher app 210 in the app information cache (S656). If the corresponding app information 172 in the cache is tagged, no ad is served (S654). If, however, the corresponding app information 172 in the cache is not tagged, an ad may be served, subject to any further processing, such as targeting processing (S658).

As shown in FIG. 6c, at a time independent from the classification of all the publisher apps and tagging of those matching predetermined criteria (e.g., adult content) in the app information cache 160, the application classification controller 150 obtains application identifiers 132 from the ad server logs 120 (S670) and compares them to the identifiers in the app information cache 160 (S672). If a matching record from the app information cache 160 has been tagged (S674), the application classification controller updates the status of the corresponding publisher app 210 in the app registry 130 (S676). In exemplary embodiments, the status is updated as "disabled" when the publisher apps were tagged due to a classification indicating adult content. However, it is recognized that other classifications may be used to prevent ads from being served to apps judged to include content that may be offensive or otherwise undesirable for advertising.

In alternative embodiments, the content classifications may be used for targeting ads according to the content classification and its pertinence to a particular desired audience. For example, apps classified as having content directed to early education may be served ads for corresponding educational products.

It is also recognized that alternative statuses or tags may be provided which indicate that a publisher app may be undesirable or inappropriate (or desirable or appropriate) to certain categories of advertised products or services. For example, it is considered that a publisher app 210 could be tagged as including content that would be offensive to an advertiser of racial-minority targeted products or services, or that would be inappropriate due to certain legal restrictions in a particular jurisdiction. For example, a country may impose legal restrictions on certain content or products, such that advertisers or ad networks should in general avoid appearing to condone or support the content. Thus, additional classifications may be used to prevent ads from being served which include such content. In one example, a tag may simply indicate a country name if the app content would be illegal in that country. The inventors recognize that such implementation may be a matter of policy rather than of law in some areas covered by an ad network.

There is little distinction left between hardware and software implementations of aspects of systems; the use of hardware or software is generally (but not always, in that in certain contexts the choice between hardware and software can become significant) a design choice representing cost versus efficiency trade-offs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:
   obtaining, from a mobile device application server, application content information that includes descriptive information and identifying information of a first mobile device application;
   storing the application content information;
   determining whether the identifying information of the first mobile device application corresponds to an application identifier found in ad request logs of an ad server;
   determining via analysis of the application content information whether or not the first mobile device application is appropriate to be served an advertisement, based on predetermined content criteria; and
   updating an app registry to indicate the determined appropriateness of the first mobile device application, the app registry including a database of mobile device applications registered in an ad network,
   wherein the application content information analyzed includes text and pictorial information, the text information being analyzed for the existence, frequency, and/or context of predetermined terms, and the pictorial information being analyzed for the existence and context of predetermined attributes related to an associated content classification.

2. The method of claim 1, wherein the updating of the app registry updates for the first mobile device application an ad service status in the app registry.

3. The method of claim 2, wherein the ad service status is updated to designate that the first mobile device application cannot be sent advertisements from the ad server when the analysis determines that the first mobile device application is not appropriate to be served an advertisement.

4. The method of claim 3, wherein the first mobile device application is determined as not appropriate to be served an advertisement when the analysis determines that the first mobile device application includes adult content.

5. The method of claim 2, wherein the determining of appropriateness results in associating the application content information with one of one or more content classifications, and
   the ad service status for the first mobile device application is updated based on the associated classification.

6. The method of claim 5, wherein the determination of appropriateness and the classification of the application content information are performed by an application classification controller comprising a processor configured to classify the content information.

7. The method of claim 5, wherein the associated content classification of the application content information is determined using statistical machine learning.

8. The method of claim 7, wherein the statistical machine learning includes supervised learning, unsupervised learning, reinforcement learning, or direct string matching.

9. The method of claim 1, wherein the mobile device application server provides mobile device applications for download to a mobile terminal device.

10. The method of claim 1, wherein the application content information of the first mobile device application includes a unique application identifier and text including one or more of: a title, an application rating; a category; a text description, URL, developer information; keywords; and/or graphics.

11. A non-transitory computer readable medium which when executed by a computer performs the steps of claim 1.

* * * * *